March 26, 1935.　　S. W. STEWART　　1,995,367
WATER PURIFICATION PLANT
Filed Oct. 29, 1931　　4 Sheets-Sheet 1

INVENTOR
Spencer W. Stewart
BY
Gifford, Scull & Burgess
ATTORNEYS.

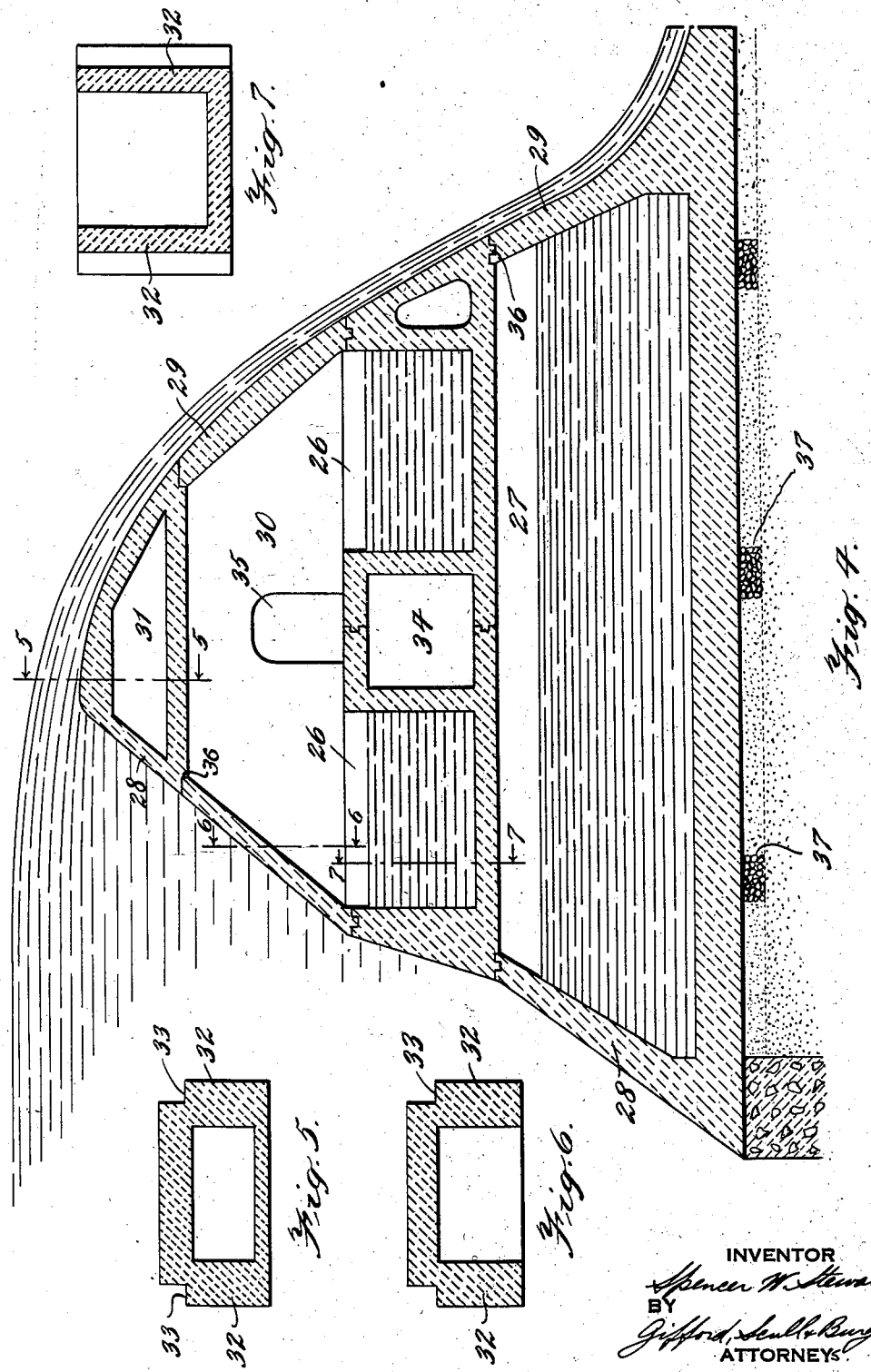

March 26, 1935. S. W. STEWART 1,995,367
WATER PURIFICATION PLANT
Filed Oct. 29, 1931 4 Sheets-Sheet 3
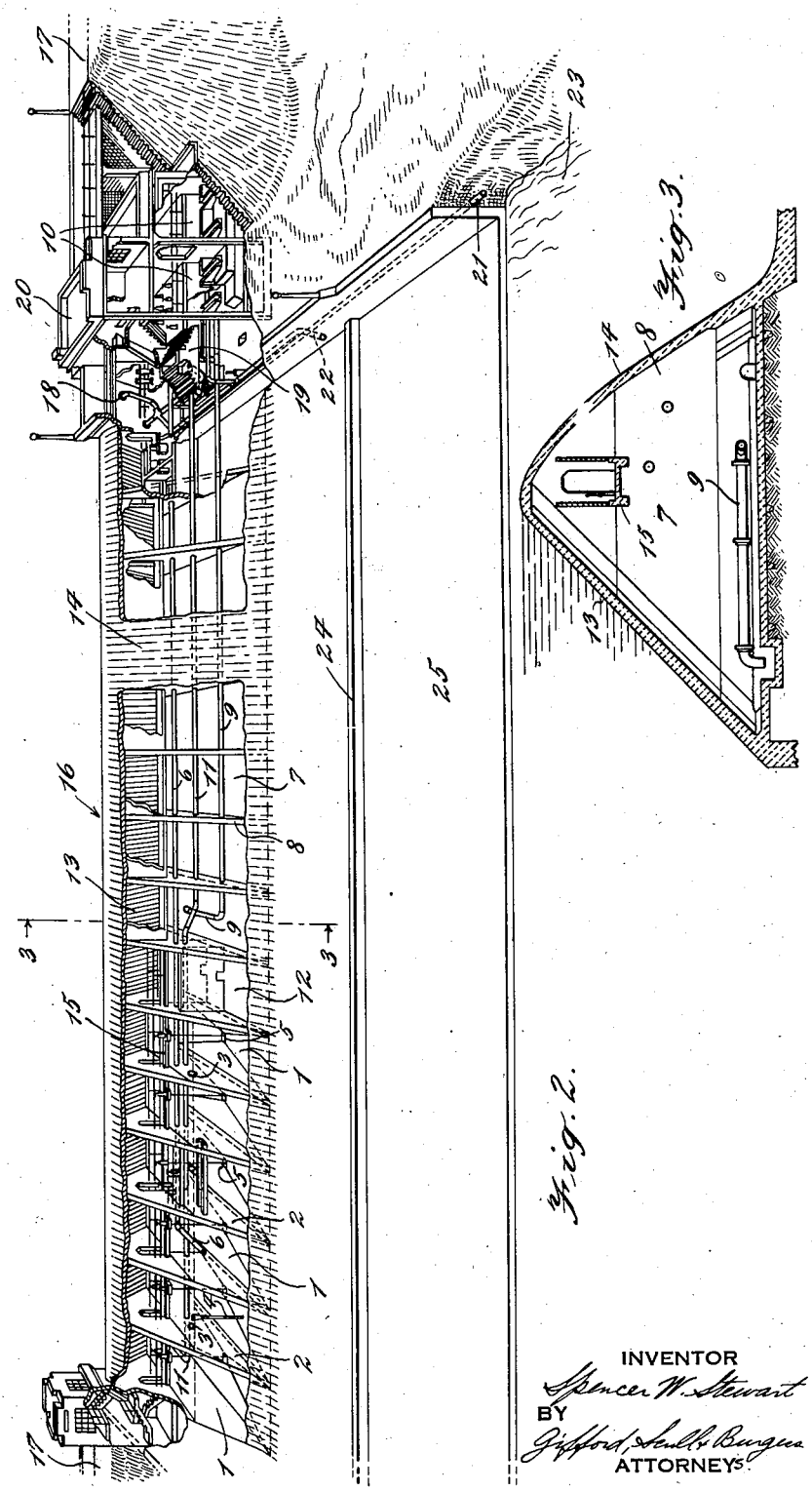

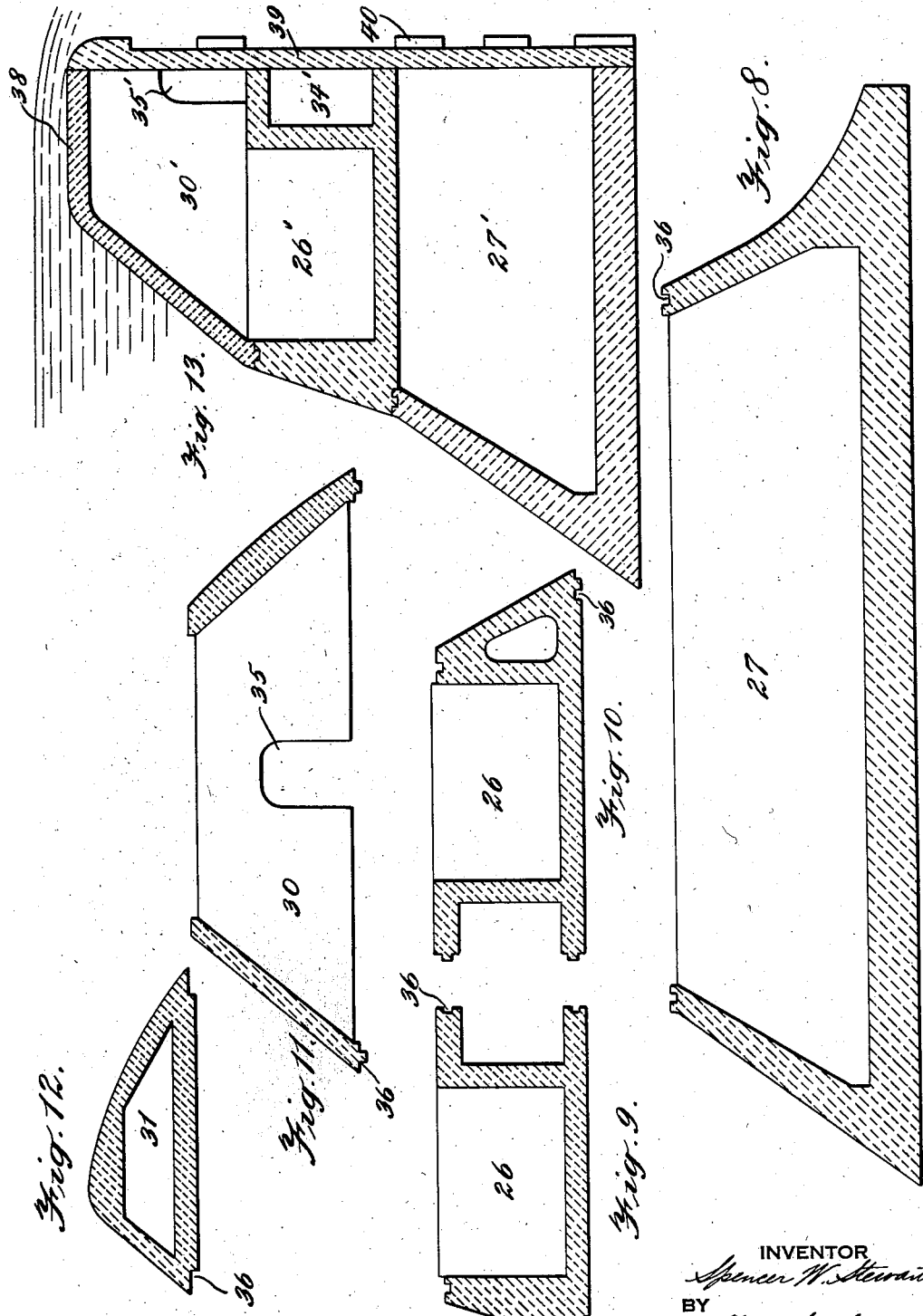

Patented Mar. 26, 1935

1,995,367

UNITED STATES PATENT OFFICE 1,995,367

WATER PURIFICATION PLANT

Spencer W. Stewart, White Plains, N. Y., assignor to Ambursen Construction Co., Inc., New York, N. Y., a corporation of New York Application October 29, 1931, Serial No. 573,477
In Canada April 10, 1928

4 Claims. (Cl. 210—13)

This invention relates to a novel and improved type of water purification plant, the novel features of which will be best understood from the following description and the annexed drawings, in which are shown selected embodiments of the invention, and in which:

Fig. 2 is a vertical elevation, with parts broken away, showing on an enlarged scale the plant appearing in Fig. 1.

Fig. 3 is a section on the line 3—3 of Fig. 2.

Fig. 4 is a vertical sectional view through a plant showing a different embodiment which the invention may take.

Fig. 5 is a section on the line 5—5 of Fig. 4.

Fig. 6 is a section on the line 6—6 of Fig. 4.

Fig. 7 is a section on the line 7—7 of Fig. 4.

Figure 1:
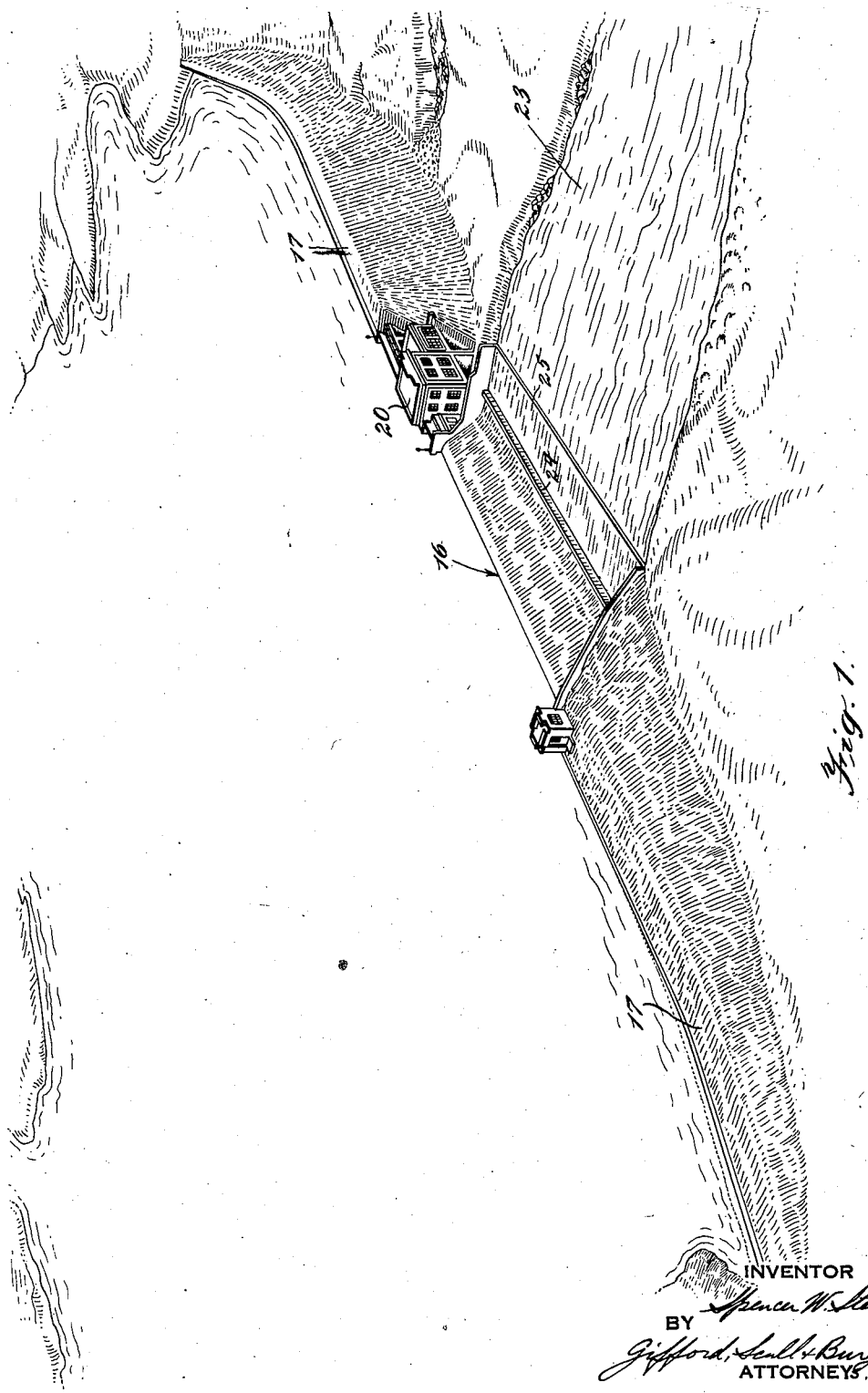
Fig. 1 is a view of a plant embodying the invention.

Figs. 8, 9, 10, 11, and 12 are sectional views illustrating the various elements appearing in Fig. 4 when used detached from each other.

Fig. 13 is a sectional view similar to Fig. 4, but showing how the invention may be embodied in a plant in such a way as to permit expansion thereof.

Referring first to Fig. 2, the invention is shown as embodied in a plant having a plurality of coagulation basins 1 which may be separated by walls 2. In the particular embodiment illustrated, there are six of these basins side by side, with walls between each two adjacent basins. The water in these basins may be maintained at a common level by means of communicating apertures 3 extending through the walls 2. One or more of the basins may be provided with overflow vents, one of which is shown at 4, and with sumps 5 which may conveniently communicate with a sewer. Water is led to the basins by a pipe 6, shown as being supported in the walls 2 and discharging into one of the basins. Of course, it is understood that other discharge points along the length of the pipe may be provided so that the water may be discharged into more than one basin at a time.

Adjacent the basins is a plurality of clearwells 7 constructed in much the same manner as the basins, and separated from each other by walls 8. The water is supplied to the clearwells by means of a pipe 9, this pipe leading from filter units indicated at 10, and the details of which need not be further illustrated or described. The water from the coagulation basins is taken into the pipe 11 and conducted to the filter units, from which the pipe 9 may conduct it to the clearwells.

In the form shown, the basins and the clearwells are separated by a space indicated at 12, although that is not essential. The basins and the wells are supplied with common vertically extending walls, here shown at 13 and 14, which walls, together with the walls 2 and 8, enclose the respective basins and wells. The walls 2 and 8 may be used to support a walkway 15 extending lengthwise through the plant.

The plant thus assembled may employ one of the common walls, as the wall 13, as a deck for the purpose of helping to impound the water to be treated. The plant is indicated generally in Fig. 1 by the numeral 16, and may conveniently be formed of a plurality of basins and wells joined together to form a part of a dam. In Fig. 1 the plant is shown as centrally located in a dam 17, extending from opposite ends of the plant. This dam may be of any usual and suitable construction. The impounded water may enter the plant through a suitable intake indicated at 18 adjacent the top of the wall 13, and this intake may conduct the water to suitable treating units indicated at 19 and the details of which need not be further illustrated or described. From such treating units, the pipe 6 may conduct the water to the filters and thence to the coagulation basins as previously described. The units 10 and 19, together with other operating units common to a water purification plant, may all be placed within a suitable structure 20 conveniently disposed at one end of the plant. After treatment, the purified water may be conducted away through a pipe indicated at 21, and sewage may be disposed of through a pipe 22.

In the illustrated embodiment, the portion of the plant comprising the basins and wells may be completely covered by the walls 13 and 14 so as to form a spillway over which the impounded water may discharge into a stream 23. For that purpose, there is provided a baffle weir wall 24 beneath the wall 14, and beneath this weir wall is a haunch 25 onto which the water may be discharged before running into the stream 23.

Referring now to Figs. 4, 5, and 6, there is shown herein a different arrangement of units going to form a water purification plant. Instead of having the units arranged side by side, as in the embodiments shown in Figs. 1, 2, and 3, the units are shown in Fig. 4 as being arranged vertically with some units above others.

In the embodiment illustrated is shown an arrangement having five different elements, all of which cooperate to form a water purification plant. These units may comprise water treating units, such as filters, for example, which are indicated at 26 and which, in Fig. 4, are shown as being disposed above a clearwell 27, which may be common to both of the filter units. It is of course to be understood that water contained in the units 26 will be conducted to the clearwell 27 by any suitable arrangement not shown. The filter units may conveniently be spaced apart to leave therebetween room for a pipe gallery 34. Above the filter units is conveniently placed another unit forming a chamber 30 which furnishes the necessary access to the filter units and other parts of the plant. The walls of the unit 30 may be provided with suitable doors 35 so that ready access may be had from one group of units to another, it being understood that any number of groups of units may be placed side by side.

On top of the unit 30 may be placed still another unit 31 which, in this instance, is designed for use as a wash-water tank.

The vertically extending walls of the various units shown at the left and right of Fig. 4 may conveniently be arranged as substantial continuations of the corresponding walls of the units above and below them, and may be secured together in any suitable manner well known in the art to form substantially continuous vertical walls, and the wall 28 may conveniently be used for impounding water which is to be treated. The walls extending at right angles to the above-mentioned walls cooperate therewith to lend rigidity thereto and to prevent deformation of said first-named walls.

By proper binding together of the different units, the entire structure may be made to act as one to resist overturning and to form a structure which may be safely relied upon to impound water to be treated. In Fig. 4 and also in Figs. 8, 9, 10, 11, and 12, I have shown joints 36 between the various units which, by proper designing, will secure the various units together to act as one.

In Fig. 4 is shown one series of units, but, as stated above, it is to be understood that this arrangement may be repeated by placing side by side, as in Fig. 2, a plurality of units separated by vertically extending walls, these walls being shown in section in Figs. 5, 6, and 7 at 32, and being provided with shoulders 33 upon which may rest the wall 28. The pipe necessary to conduct water between the different units shown in Fig. 4 has been omitted, it being understood that any suitable arrangement of piping may be employed, which piping will run through the gallery 34.

When the plant is to be used for the purpose of impounding the water which it is treating, drains 37 are provided beneath the bottom of the lowest unit, which here is shown as a clear water basin. These drains prevent the accumulation of water beneath the plant to an extent which would cause an upward pressure, and therefore they make it possible to use the plant as a water impounding means.

In Figs. 8, 9, 10, 11, and 12 I have shown the units separated from each other, as it is to be understood that these units may be used separately where the occasion requires. Thus the clear water basin 27 may be placed in one position, and the filter units 26 which supply water to the clear water basin may be placed in some other position than that shown in Fig. 4, for example at the same level as the clear water basin. By placing one on top of the other, however, certain advantages may be obtained. Among these advantages are compactness and avoidance of loss of head, together with a minimum of pumping.

It has been common practice to place the units of a water-treating plant at approximately the same level where convenient spacing will be found and then to impound water and convey it to the plant. By the arrangement described, however, it is possible to avoid conveying the water from the place where it is impounded to the plant, because the plant itself forms part of the impounding means. Each unit in itself is designed for stability independently of the others, and the units are also designed to be put together to form a stable water-impounding structure. The flexibility of the arrangement will be apparent to those skilled in the art.

In Fig. 13 is shown one example of flexibility of the arrangement described. In this figure is shown a clear water basin 27', substantially half as large as that in Fig. 4, and above this are placed the filter unit 26' and the chamber 30'. In this particular embodiment, the wash-water tank has been omitted, although it is of course to be understood that such a tank may be used if required. However, the chamber 30' has been provided with a roof 38, and the entire structure is provided with a temporary face 39. The plant can be easily expanded by adding thereto other units to make a structure corresponding to that of Fig. 4, suitable joints 40 being left for the purpose of uniting the old structure to the new. With this arrangement, the structure shown in Fig. 13 may be used as part of a water-impounding device which can be readily expanded either longitudinally or laterally, as desired.

While the invention has been shown in selected embodiments, it is to be understood that various changes in details may be made without departing from the scope of the invention, and I therefore do not intend to limit myself except by the appended claims.

I claim:

1. A plant for the treatment of water comprising a plurality of units, each unit being adapted to perform a step in the treatment of the water and having a vertically extending wall, said units being placed in said plant one above the other with said vertically extending walls thereof disposed edge to edge to form a substantially continuous vertically extending wall and so that the water may pass from one unit to another for successive steps in the treatment thereof, means forming substantially water-tight joints between adjacent walls, whereby said walls together form a water bearing surface, and each unit being so designed structurally that the assembled units act together to resist overturning by the pressure of water on said surface.

2. A plant for the treatment of water comprising a plurality of units, each unit being adapted to perform a step in the treatment of the water and having a vertically extending wall, said units being placed in said plant one above the other with said vertically extending walls thereof disposed edge to edge to form a substantially continuous vertically extending wall and so that the water may pass from one unit to another for successive steps in the treatment thereof, and means forming substantially water-tight joints between adjacent walls, whereby said walls together form a water bearing surface, one unit having its top narrower than its bottom and of the same width as the bottom of the next unit above, as measured in a direction normal to said surface.

3. A plant for the treatment of water comprising a plurality of units, each unit being adapted to perform a step in the treatment of the water and having a vertically extending wall, said units being placed in said plant one above the other with said vertically extending walls thereof disposed edge to edge to form a substantially continuous vertically extending wall and so that the water may pass from one unit to another for successive steps in the treatment thereof, means forming substantially water-tight joints between adjacent walls, whereby said walls together form a water bearing surface, each unit being so designed structurally that the assembled units act together to resist overturning by the pressure of water on said surface, and drains disposed beneath the lowest unit to prevent upward hydrostatic pressure thereon.

4. A plant for the treatment of water and comprising a plurality of units, each unit being adapted to perform a step in the treatment of the water and the units being so placed in the plant and with respect to each other that the water may pass from one unit to another for successive steps in the treatment, each unit having a vertically extending wall shaped to form part of the water bearing deck of a dam and the walls of the units being placed edge to edge to form the continuous deck, means forming substantially water-tight joints between said walls, said units being so shaped individually and with respect to each other that when assembled into the completed plant, said plant will have the cross-section of a dam designed to resist overturning by pressure of water on said deck.

SPENCER W. STEWART.